US012633264B2

(12) United States Patent
Kwon et al.

(10) Patent No.: US 12,633,264 B2
(45) Date of Patent: May 19, 2026

(54) DISPLAY DEVICE

(71) Applicant: LG Display Co., Ltd., Seoul (KR)

(72) Inventors: Yong Chul Kwon, Paju-si (KR); Dong Won Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/953,679

(22) Filed: Nov. 20, 2024

(65) Prior Publication Data

US 2025/0218404 A1 Jul. 3, 2025

(30) Foreign Application Priority Data

Dec. 29, 2023 (KR) ........................ 10-2023-0197869

(51) Int. Cl.
*G09G 3/3291* (2016.01)
*G09G 3/32* (2016.01)

(52) U.S. Cl.
CPC ............ *G09G 3/3291* (2013.01); *G09G 3/32* (2013.01); *G09G 2310/0275* (2013.01); *G09G 2310/08* (2013.01); *G09G 2330/021* (2013.01)

(58) Field of Classification Search
CPC .................................................. G09G 3/3291
USPC ........................................................ 345/204
See application file for complete search history.

(56) References Cited

U.S. PATENT DOCUMENTS

| | | | | |
|---|---|---|---|---|
| 2021/0201784 A1 | 7/2021 | Kim et al. | | |
| 2023/0046059 A1* | 2/2023 | Park | G09G 3/3258 | |
| 2023/0206839 A1* | 6/2023 | Oh | G09G 3/3233 | 345/694 |
| 2023/0215335 A1* | 7/2023 | Park | G09G 3/2096 | 345/214 |

FOREIGN PATENT DOCUMENTS

| | | | |
|---|---|---|---|
| KR | 10-2017-0072407 A | 6/2017 | |
| KR | 10-1981677 B1 | 8/2019 | |
| KR | 10-2021-0084060 A | 7/2021 | |

* cited by examiner

*Primary Examiner* — Long D Pham
(74) *Attorney, Agent, or Firm* — Morgan, Lewis & Bockius LLP

(57) ABSTRACT

A display device includes a display panel including a subpixel connected to a power line, a data line, and a reference line; a power supply configured to supply power to the display panel through the power line; a data driver including a driving circuit configured to supply a data voltage to the display panel through the data line, and a sensing circuit configured to sense the display panel through the reference line; and a timing controller configured to control the power supply and the data driver, wherein the sensing circuit may have a variable sampling point for sensing the display panel in response to a change in a level of the power.

10 Claims, 16 Drawing Sheets

DISPLAY DEVICE

This application claims the benefit of and priority to Korean Patent Application No. 10-2023-0197869, filed on Dec. 29, 2023, which is hereby incorporated by reference as if fully set forth herein.

BACKGROUND

Field

The present disclosure relates to a display device.

Discussion of the Related Art

With the development of information technology, the market for display devices that are media for connection between users and information has been growing. Accordingly, display devices such as a light-emitting display (LED) device, a quantum dot display (QDD), and a liquid crystal display (LCD) have been increasingly used.

Each of the above display devices includes a display panel including subpixels, a driver configured to output a driving signal for driving of the display panel, and a power supply configured to generate power to be supplied to the display panel or the driver.

In such a display device, when driving signals, for example, scan signals and data signals, are supplied to subpixels formed in a display panel, a selected one of the subpixels may transmit light therethrough or may directly emit light, thereby displaying an image.

SUMMARY

Accordingly, the present disclosure is directed to a display device that substantially obviates one or more problems due to limitations and disadvantages of the related art.

The present disclosure varies a sampling point in response to a change in a level of first power or reflects a change in the level of the first power in a sensing voltage to increase a probability of acquiring a constant (uniform) sensing voltage, thereby improving compensation accuracy and minimizing or reducing occurrence of sensing errors due to the change in the level of the first power.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display panel including a subpixel connected to a power line, a data line, and a reference line; a power supply configured to supply power to the display panel through the power line; a data driver including a driving circuit configured to supply a data voltage to the display panel through the data line, and a sensing circuit configured to sense the display panel through the reference line; and a timing controller configured to control the power supply and the data driver, wherein the sensing circuit may have a variable sampling point for sensing the display panel in response to a change in a level of the power.

The sensing circuit may advance the sampling time from a reference sampling time when the level of the power becomes higher than a reference level, and may delay the sampling time from the reference sampling time when the level of the power becomes lower than the reference level.

The sensing circuit may include a sampling circuit configured to sense the reference line, and the sampling time may correspond to a turn-on time of the sampling circuit.

The timing controller may be configured to calculate a level of the first power required to drive the display panel based on a data signal to prepare a first power calculation value, and may generate a sampling control signal for varying the sampling time based on the first power calculation value.

The timing controller may generate a sampling control signal for varying the sampling time based on one of a first power sensing value prepared by sensing the first power output from the power supply and the first power calculation value prepared.

In another aspect of the present disclosure, a display device includes a display panel including a subpixel connected to a power line, a data line, and a reference line; a power supply configured to supply power to the display panel through the power line; a data driver including a driving circuit configured to supply a data voltage to the display panel through the data line, and a sensing circuit configured to sense the display panel through the reference line to prepare a sensing voltage; and a timing controller configured to control the power supply and the data driver, wherein the timing controller may be configured to prepare a sensing voltage corrected by reflecting a change of a level of the power in the sensing voltage transmitted from the sensing circuit and to compensate for a data signal based on the corrected sensing voltage to generate a compensated data signal.

The timing controller may be configured to calculate a level of the first power required to drive the display panel based on the data signal to prepare a first power calculation value, predict a change of the level of the first power based on the first power calculation value, and reflect the predicted change in the sensing voltage to prepare the corrected sensing voltage.

The timing controller may predict a change of the level of the first power based on one of a first power sensing value prepared by sensing the first power output from the power supply and the first power calculation value, and may reflect the predicted change in the sensing voltage to prepare the corrected sensing voltage.

The timing controller may generate a sampling control signal that varies a sampling time for sensing the display panel based on one of the first power sensing value and the first power calculation value.

The sensing circuit may comprise a sampling circuit configured to sense the reference line to prepare the sensing voltage, and the sampling time may correspond to a turn-on time of the sampling circuit.

The timing controller may include a lookup table including a data table for preparing the corrected sensing voltage in response to a change in the level of the first power.

It is to be understood that both the foregoing general description and the following detailed description of the present disclosure are by way of example and are intended to provide further explanation of the disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principles of the disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

The present disclosure may be implemented as a television, a video player, a personal computer (PC), a home theater, an automotive electric device, or a smartphone, but is not limited thereto. The present disclosure may be implemented as an LED device, a QDD, or an LCD. For convenience of description, an LED device that directly emits light based on an inorganic light-emitting diode or an organic light-emitting diode will hereinafter be taken as an example.

Figure 1:
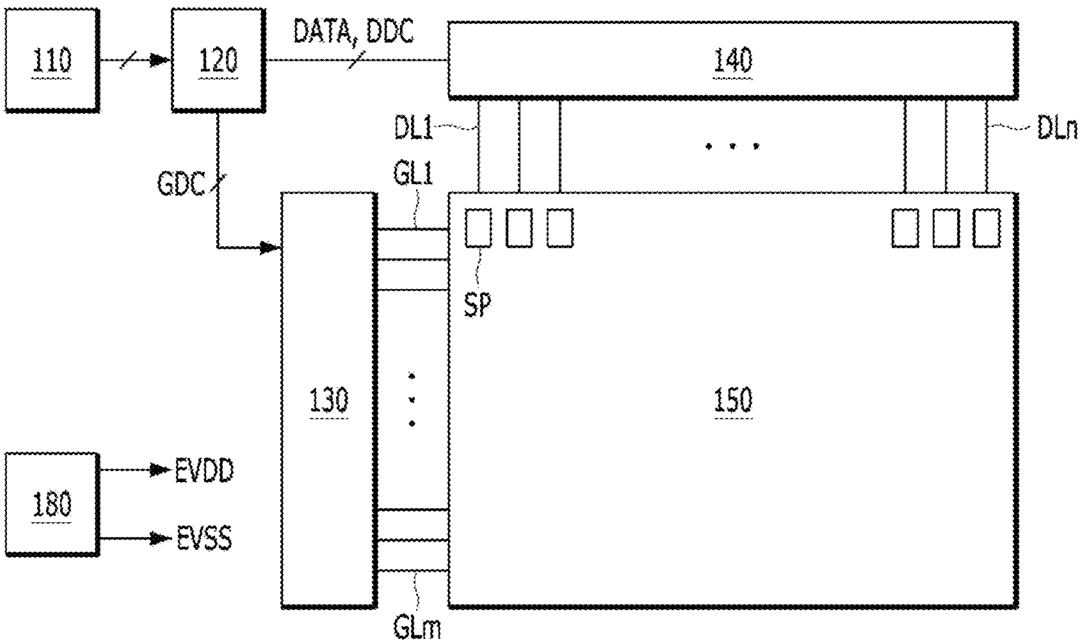
FIG. 1 is a block diagram schematically illustrating an LED device according to example embodiments of the present disclosure.
Figure 2:
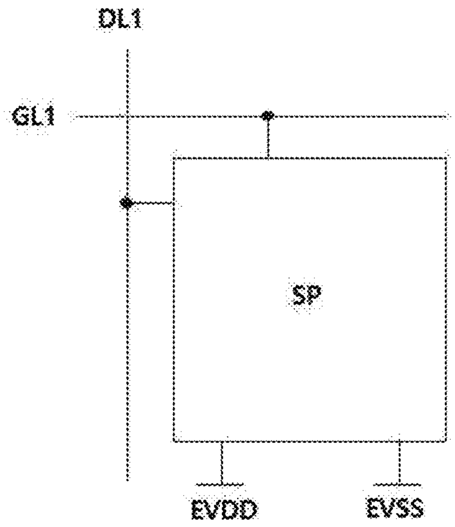
FIG. 2 is a configuration diagram schematically illustrating an example of a subpixel illustrated in FIG. 1.
Figure 3:
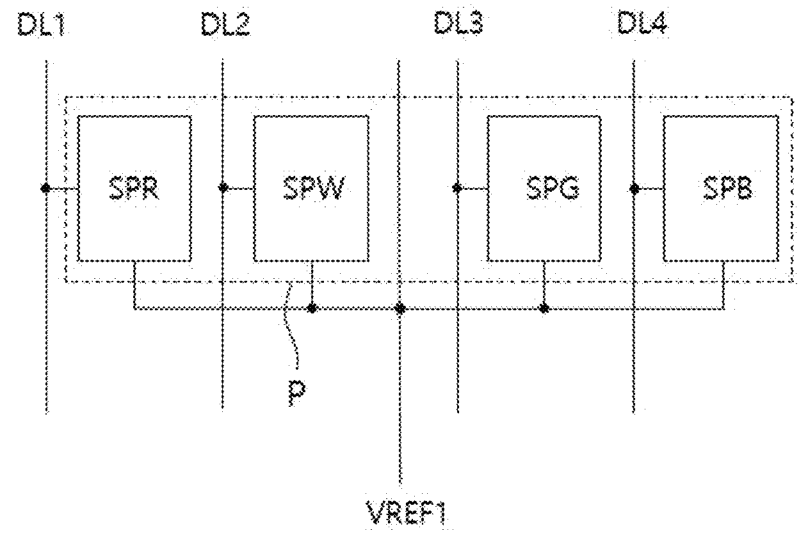
FIG. 3 is an example diagram of a pixel including subpixels.

FIG. 1 is a block diagram schematically illustrating an example LED device, FIG. 2 is a configuration diagram schematically illustrating an example of a subpixel illustrated in FIG. 1, and FIG. 3 is an example diagram of a pixel including subpixels.

As illustrated in FIGS. 1 to 3, the LED device may include an image supply 110, a timing controller 120, a scan driver 130, a data driver 140, a display panel 150, a power supply 180, etc.

The image supply (set or host system) 110 may output various driving signals together with an externally-supplied image data signal or an image data signal stored in an internal memory. The image supply 110 may supply the data signal and the various driving signals to the timing controller 120.

The timing controller 120 may output a gate timing control signal GDC for control of operation timing of the scan driver 130, a data timing control signal DDC for control of operation timing of the data driver 140, various synchronization signals, etc. The timing controller 120 may supply a data signal DATA supplied from the image supply 110 together with the data timing control signal DDC to the data driver 140. The timing controller 120 may take the form of an integrated circuit (IC) and be mounted on a printed circuit board, but is not limited thereto.

The scan driver 130 may output a scan signal (or scan voltage) in response to the gate timing control signal GDC supplied from the timing controller 120. The scan driver 130 may supply the scan signal to each of subpixels included in the display panel 150 through gate lines GL1 to GLm. The scan driver 130 may take the form of an IC or may be formed directly on the display panel 150 in a GIP manner, but is not limited thereto.

The data driver 140 may sample and latch the data signal DATA in response to the data timing control signal DDC supplied from the timing controller 120, convert the resulting digital data signal into an analog data voltage based on a gamma reference voltage, and output the converted analog data voltage. The data driver 140 may supply data voltages to the subpixels included in the display panel 150 through data lines DL1 to DLn. The data driver 140 may take the form of an IC and be mounted on the display panel 150 or on the printed circuit board, but is not limited thereto.

The power supply 180 may generate high-potential first power and low-potential second power based on an external input voltage supplied from the outside. The power supply 180 may output the first power through a first power line EVDD and output the second power through a second power line EVSS. The power supply 180 may generate and output not only the first power and the second power but also a voltage required to drive the scan driver 130 (for example, a scan high voltage and a scan low voltage) or a voltage required to drive the data driver 140 (a drain voltage and a half-drain voltage). The power supply 180 may generate and vary the high-potential first power and the low-potential second power under the control of the timing controller 120. However, the present disclosure is not limited thereto.

The display panel 150 may display an image in response to a scan signal, a driving signal including a data voltage, the first power, the second power, etc. Subpixels of the display panel 150 directly emit light. The display panel 150 may be manufactured based on a rigid or flexible substrate of glass, silicon, polyimide, etc. For example, one subpixel SP may be connected to the first data line DL1, the first gate line GL1, the first power line EVDD, and the second power line EVSS, and may include a pixel circuit including a switching transistor, a driving transistor, a capacitor, an organic light-emitting diode, etc.

The subpixel SP used in the LED device directly emits light, and thus has a complex circuit configuration. In addition, there are various compensation circuits that compensate for deterioration of not only the organic light-emitting diode that emits light, but also the driving transistor that supplies a driving current required to drive the organic light-emitting diode. Therefore, note that the subpixel SP is simply shown in the form of a block.

Subpixels that emit light may include pixels having colors of red, green, and blue or pixels having colors of red, green, blue, and white. For example, one pixel P may include a red subpixel SPR connected to the first data line DL1, a white subpixel SPW connected to the second data line DL2, a green subpixel SPG connected to the third data line DL3, and a blue subpixel SPB connected to the fourth data line DL4. Further, the red subpixel SPR, the white subpixel SPW, the green subpixel SPG, and the blue subpixel SPB may be commonly connected to a first reference line VREF1. The first reference line VREF1 may be used to sense deterioration of an element(s) included in one of the red subpixel SPR, the white subpixel SPW, the green subpixel SPG, and the blue subpixel SPB, which is discussed below.

Meanwhile, the timing controller 120, the scan driver 130, the data driver 140, etc., have been described above as having individual configurations. However, one or more of the timing controller 120, the scan driver 130, and the data driver 140 may be integrated into one IC depending on the implementation scheme of the LED device. In addition, a pixel P in which the red subpixel SPR, the white subpixel SPW, the green subpixel SPG, and the blue subpixel SPB are disposed in this order has been illustrated above as an example. However, an arrangement order and direction of the subpixels may vary depending on the implementation scheme of the LED device.

Figure 4:
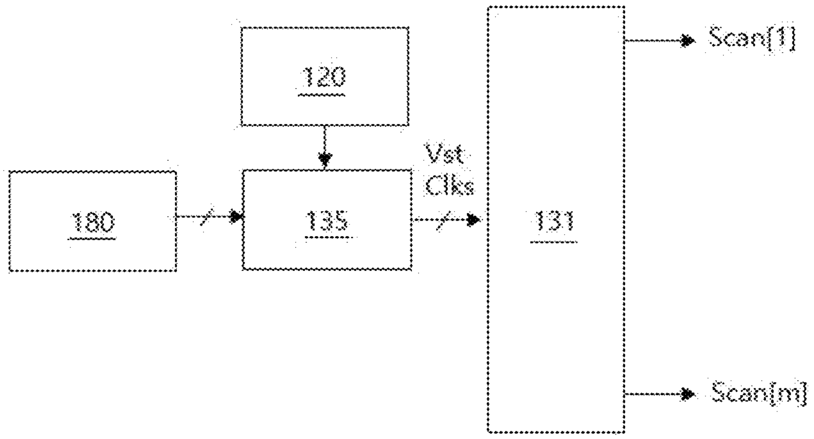
FIGS. 4 and 5 are diagrams for describing example configurations of a gate-in-panel (GIP)-type scan driver.
Figure 5:
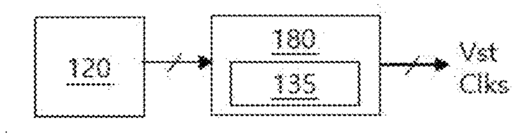
Figure 6:
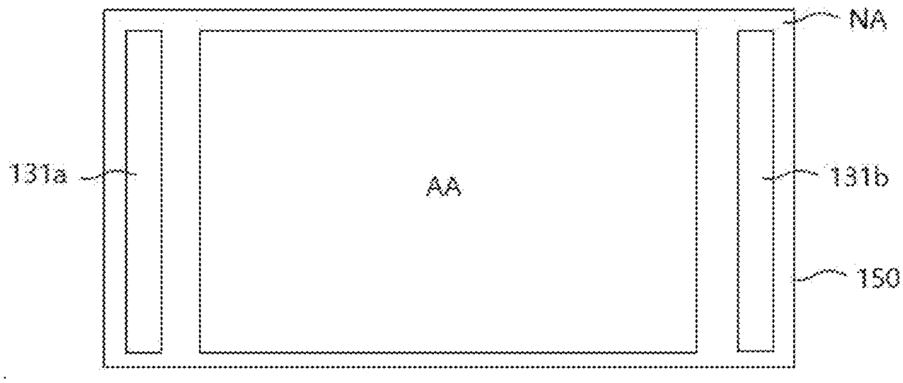
FIG. 6 is a diagram illustrating an arrangement example of the GIP-type scan driver.

FIGS. 4 and 5 are diagrams for describing example configurations of a GIP-type scan driver, and FIG. 6 is a diagram illustrating an arrangement example of the GIP-type scan driver.

As illustrated in FIG. 4, the GIP-type scan driver may include a shift register 131 and a level shifter 135. The level shifter 135 may generate driving clock signals Clks, a start signal Vst, etc. based on signals and voltages output from the timing controller 120 and the power supply 180.

The shift register 131 may operate based on the signals Clks and Vst output from the level shifter 135 and output scan signals Scan[1] to Scan[m] capable of turning on or turning off the transistors formed on the display panel. The shift register 131 may take the form of a thin film and be formed on the display panel using a GIP method.

As illustrated in FIGS. 4 and 5, unlike the shift register 131, the level shifter 135 may independently take the form of an IC or be included in the power supply 180. However, this is only an example, and the present disclosure is not limited thereto.

As illustrated in FIG. 6, in the GIP-type scan driver, first and second shift registers 131*a* and 131*b* configured to output scan signals may be disposed in a non-active area NA of the display panel 150. The shift registers 131*a* and 131*b* are illustrated as being disposed in the non-active area NA on the right and left side of the display panel 150 as an example. However, the shift registers 131*a* and 131*b* may be disposed in the non-active area NA on the upper and lower sides of the display panel 150, or may be disposed in an active area AA of the display panel 150.

Figure 7:
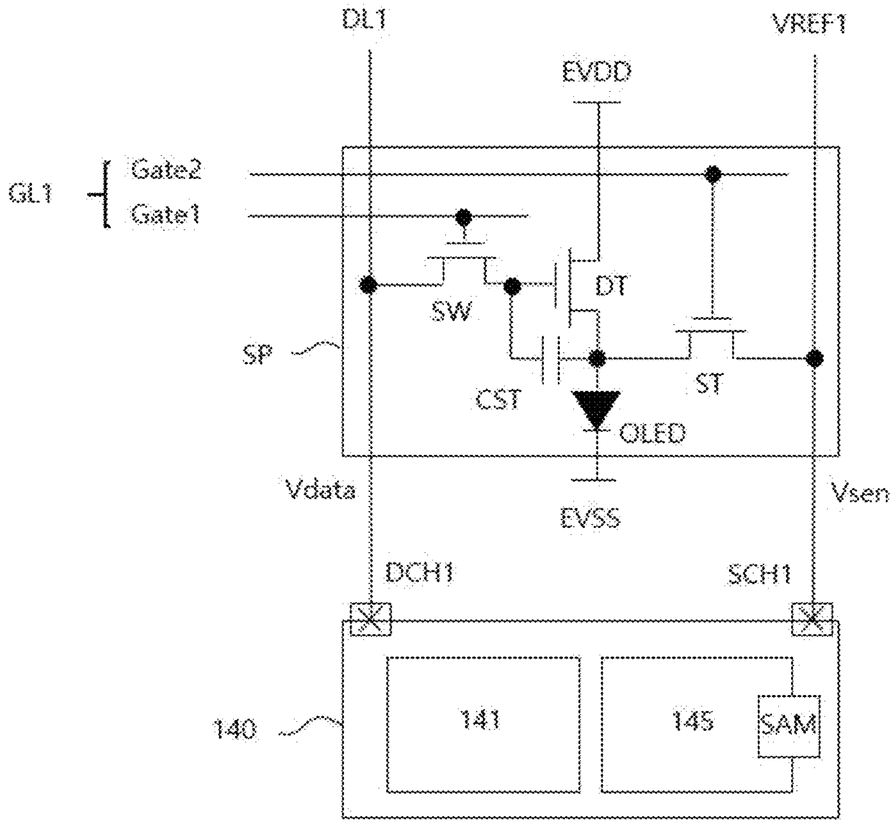
FIG. 7 is an example diagram briefly illustrating a subpixel and a data driver according to a first example embodiment.
Figure 8:
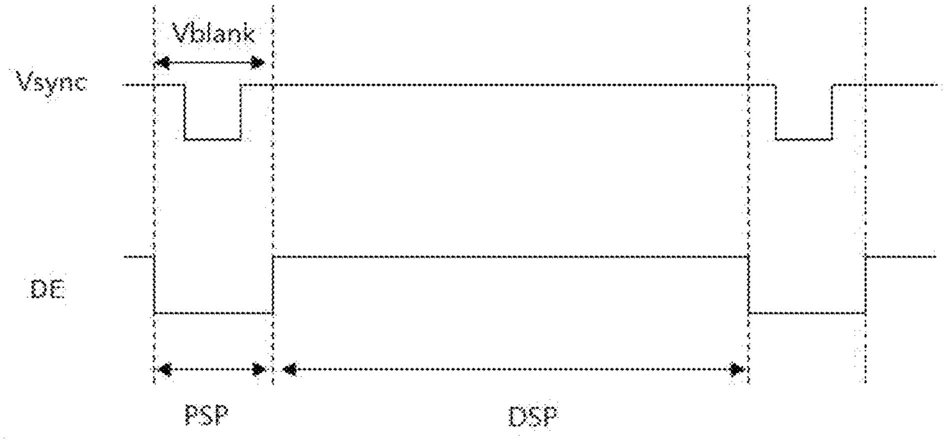
FIG. 8 is a waveform diagram for describing a sensing period and a display period according to the first embodiment.
Figure 9:
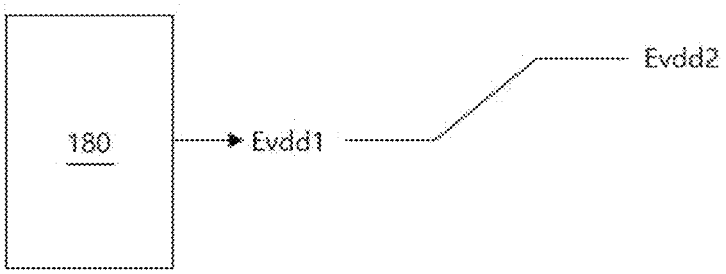
FIGS. 9 and 10 are drawings for describing example output variations of a power supply according to the first embodiment.
Figure 10:
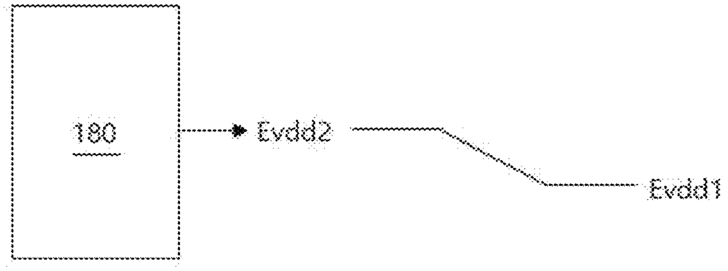
Figure 11:
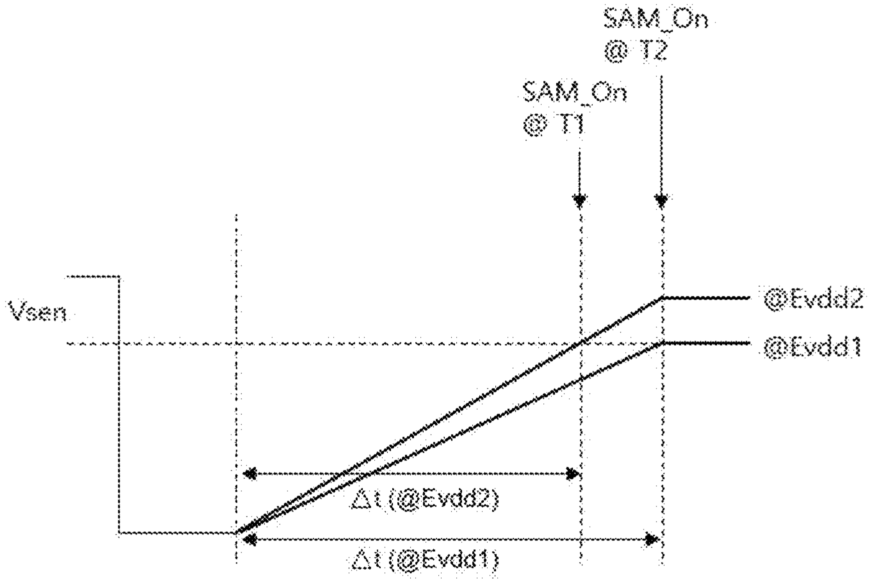
FIG. 11 is a drawing for describing a method of varying a sampling point in response to the output variation of the power supply according to the first embodiment.
Figure 12:
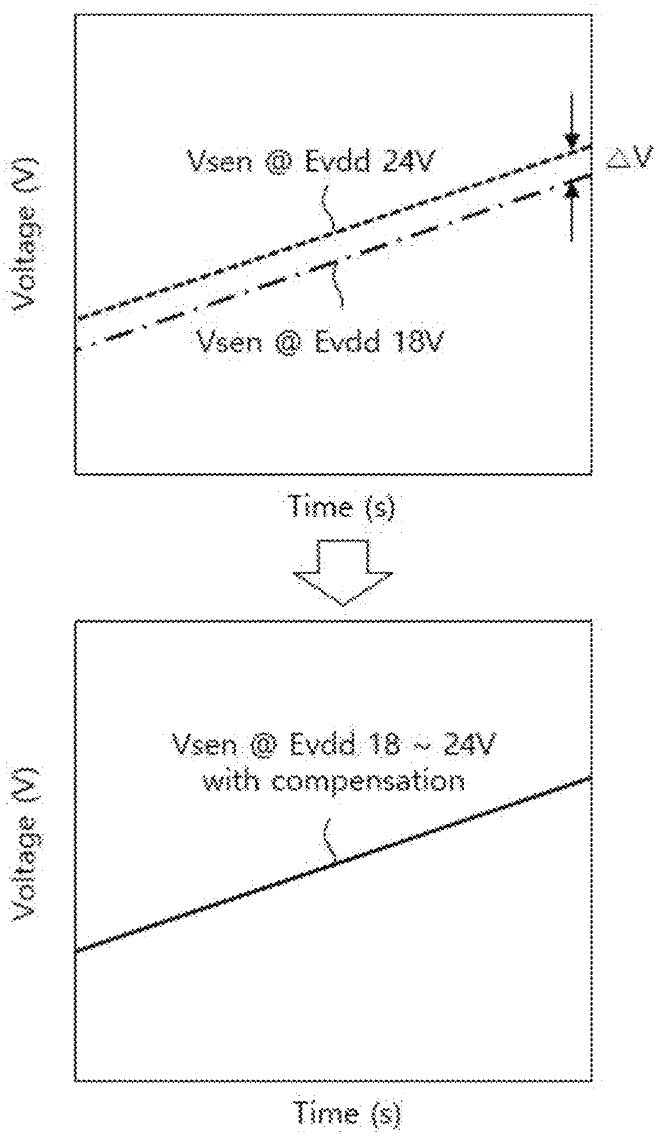
FIG. 12 is a drawing for describing an advantage according to the first embodiment.

FIG. 7 is an example diagram briefly illustrating a subpixel and a data driver according to a first example embodiment, FIG. 8 is a waveform diagram for describing a sensing period and a display period according to the first embodiment, FIGS. 9 and 10 are drawings for describing example output variations of a power supply according to the first embodiment, FIG. 11 is a drawing for describing a method of varying a sampling point in response to the output variation of the power supply according to the first embodiment, and FIG. 12 is a drawing for describing an advantage according to the first embodiment.

As illustrated in FIG. 7, according to the first example embodiment, one subpixel SP may include a switching transistor SW, a driving transistor DT, a sensing transistor ST, a capacitor CST, and an organic light-emitting diode OLED.

The driving transistor DT may have a gate electrode connected to a first electrode of the capacitor CST, a first electrode connected to the first power line EVDD, and a second electrode connected to an anode of the organic light-emitting diode OLED. The capacitor CST may have the first electrode connected to the gate electrode of the driving transistor DT and a second electrode connected to the anode of the organic light-emitting diode OLED. The organic light-emitting diode OLED may have the anode connected to the second electrode of the driving transistor DT and a cathode connected to the second power line EVSS.

The switching transistor SW may have a gate electrode connected to a first scan line Gate1 included in the first gate line GL1, a first electrode connected to the first data line DL1, and a second electrode connected to the gate electrode of the driving transistor DT. The sensing transistor ST may have a gate electrode connected to a second scan line Gate2 included in the first gate line GL1, a first electrode connected to a first reference line VREF1, and a second electrode connected to the anode of the organic light-emitting diode OLED.

The sensing transistor ST is a type of compensation circuit added to compensate for deterioration (in threshold voltage, mobility, etc.) of the driving transistor DT or organic light-emitting diode OLED. The sensing transistor ST may enable physical threshold voltage sensing based on a source follower operation of the driving transistor DT. The sensing transistor ST may operate to acquire a sensing voltage through a sensing node defined between the driving transistor DT and the organic light-emitting diode OLED. Meanwhile, the first gate line GL1 may be integrated into one without being divided into the first scan line Gate1 and the second scan line Gate2. That is, the switching transistor SW and the sensing transistor ST may be commonly connected to the first gate line GL1 and turned on or off at the same time.

In addition, according to the first embodiment, the data driver 140 may include a driving circuit 141 for driving the subpixel SP and a sensing circuit 145 for sensing the subpixel SP. The driving circuit 141 may be connected to the first data line DL1 through a first data channel DCH1. The driving circuit 141 may output a data voltage Vdata for driving the subpixel SP through the first data channel DCH1.

The sensing circuit 145 may be connected to the first reference line VREF1 through a first sensing channel SCH1. The sensing circuit 145 may acquire a sensing voltage Vsen sensed from the subpixel SP through the first sensing channel SCH1. The sensing circuit 145 may acquire the sensing voltage Vsen based on a current sensing or voltage sensing method. The sensing circuit 145 may include a sampling circuit SAM that operates to acquire the sensing voltage Vsen, etc. The sampling circuit SAM is simply shown as a switch, but is not limited thereto.

As illustrated in FIG. 8, the LED device according to the first embodiment may drive the display panel separately for a sensing period PSP and a display period DSP based on a vertical synchronization signal Vsync and a data enable signal DE. As an example, the sensing period PSP occurs in response to a vertical blank period Vblank included in the vertical synchronization signal Vsync, but is not limited thereto.

As illustrated in FIGS. 7 and 8, the LED device according to the first embodiment may drive the sensing circuit 145 during the sensing period PSP to sense the subpixel SP included in the display panel. In addition, the LED device according to the first embodiment may drive the driving circuit 141 during the display period DSP to display an image based on the subpixel SP included in the display panel.

As illustrated in FIGS. 8 to 10, the LED device according to the first embodiment may vary the first power output from the power supply 180 during at least one of the sensing period PSP or the display period DSP. For example, the power supply 180 may output first power Evdd1 at a first level and then output first power Evdd2 at a higher second level or may conversely vary the first power.

The LED device according to the first embodiment may vary the first power output from the power supply 180 to reduce power consumption or improve color reproduction ability. A level of the first power is not limited to that of FIGS. 9 and 10 and may be changed to various levels depending on the characteristics of the image displayed on the display panel.

As illustrated in FIGS. 7 to 11, the LED device according to the first embodiment may vary a sampling point (specifically, a start point) of the sampling circuit SAM in response to a change in the first power during the sensing period PSP for acquiring the sensing voltage Vsen. For example, when the first power Evdd1 at the first level is output from the power supply 180, a second time SAM_On @ T2 may be selected as the sampling point of the sampling circuit SAM. In contrast, when the first power Evdd2 at the second level, which is higher than the first power Evdd1 at the first level, is output from the power supply 180, a first time SAM_On @ T1, which is earlier than the second time SAM_On @ T2, may be selected as the sampling point of the sampling circuit SAM.

FIG. 12 is a reference diagram illustrating that a problem in that a deviation ΔV is present in the sensing voltage Vsen when the first power Evdd varies between 18 V and 24 V is solved using a compensation method of the first embodiment so that a constant (uniform) sensing voltage Vsen may be acquired.

As in the first embodiment, by varying the sampling point of the sampling circuit SAM in response to variation of the first power Evdd output from the power supply 180, a probability of acquiring a constant (uniform) sensing voltage Vsen may be increased even when a current value varies in response to a change in the first power Evdd. Therefore, the first embodiment may improve compensation accuracy and minimize occurrence of sensing errors since a constant (uniform) sensing voltage (sensing voltage value) Vsen may be acquired even when a level of the first power Evdd is varied.

Figure 13:
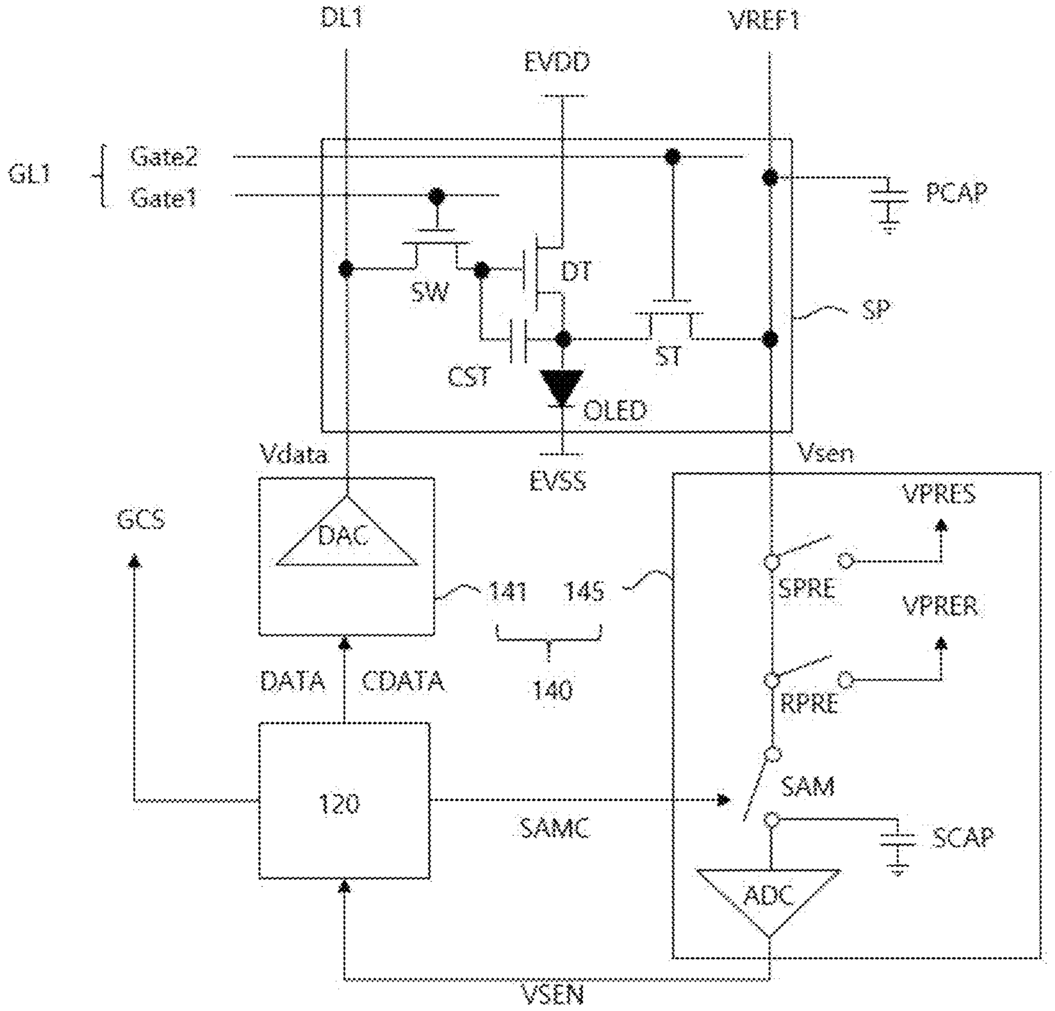
FIG. 13 is an example diagram illustrating a subpixel and a data driver in more detail according to a second example embodiment.
Figure 14:
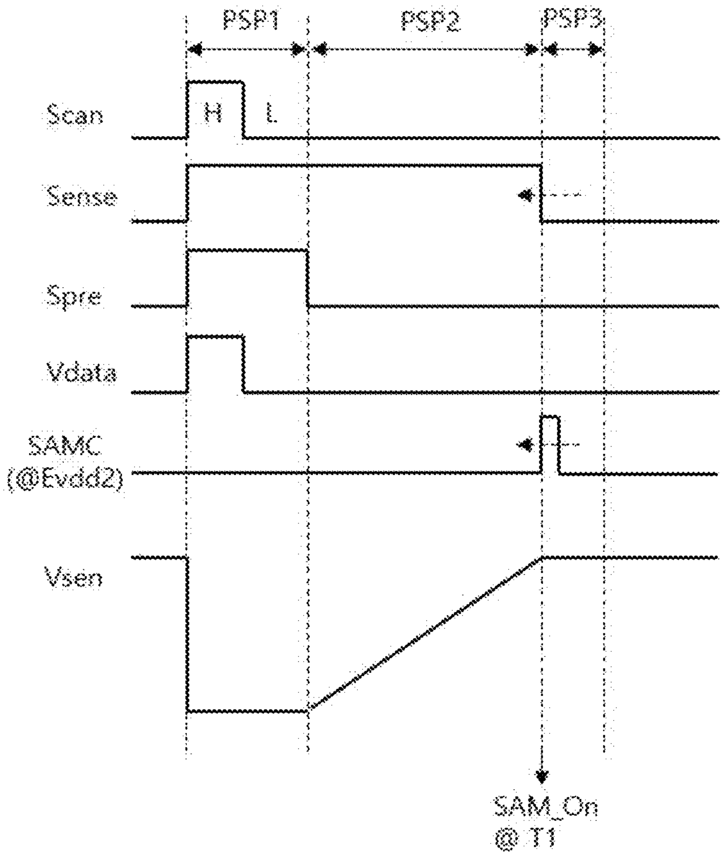
FIGS. 14 and 15 are waveform diagrams for describing a sampling method according to the second embodiment.
Figure 15:
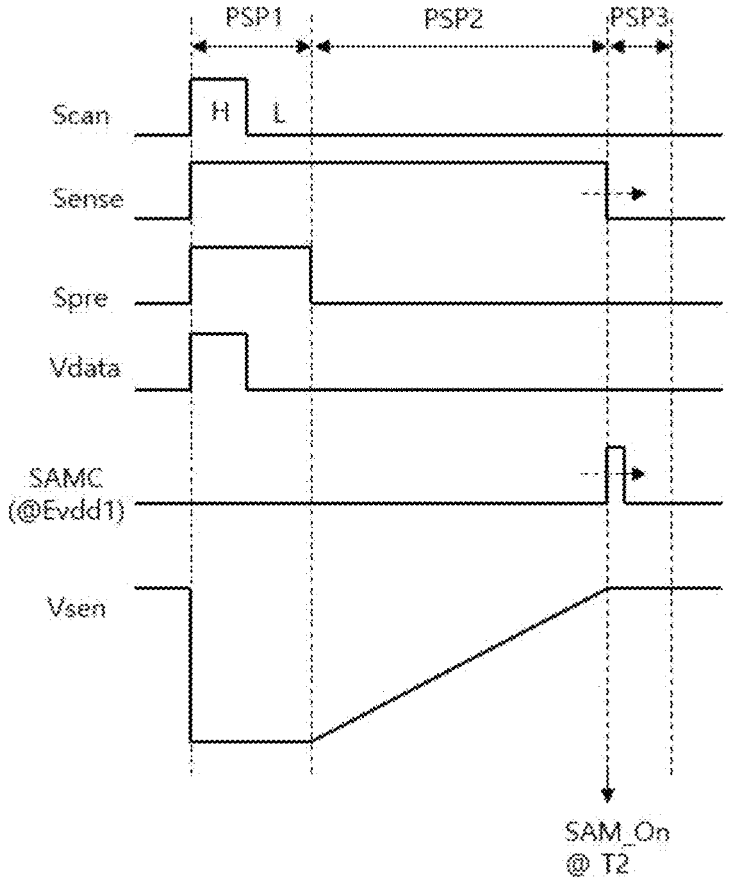
Figure 16:
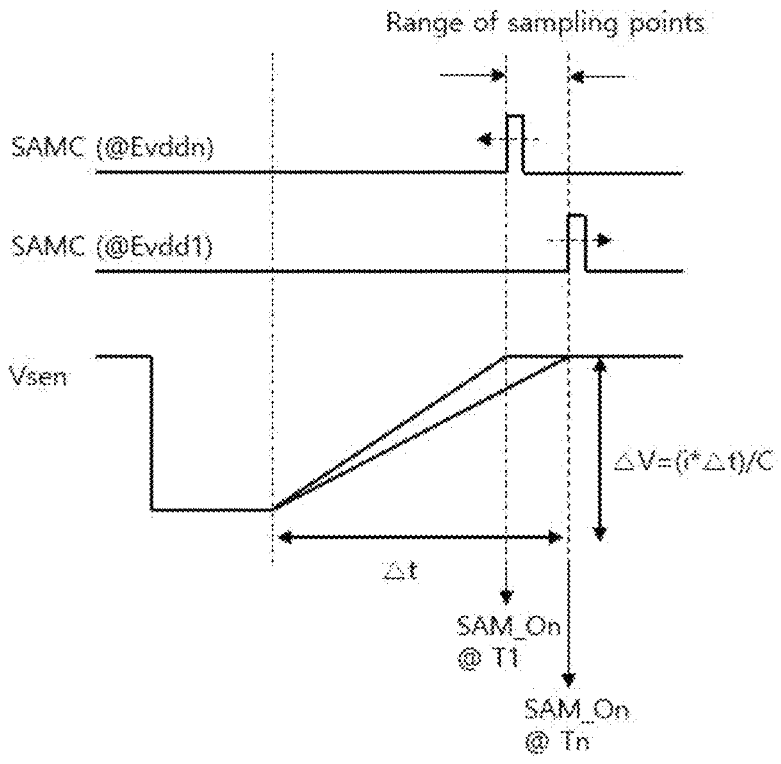
FIGS. 16 and 17 are diagrams for describing that a sampling point may be varied in response to variation of first power.
Figure 17:
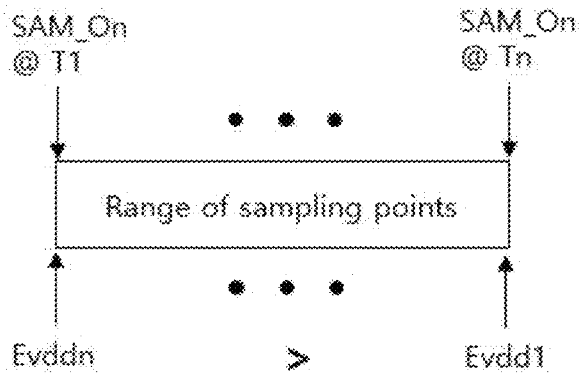

FIG. 13 is an example diagram illustrating a subpixel and a data driver in more detail according to a second example embodiment, FIGS. 14 and 15 are waveform diagrams for describing a sampling method according to the second embodiment, and FIGS. 16 and 17 are diagrams for describing that a sampling point is varied in response to variation of first power.

As illustrated in FIG. 13, according to the second embodiment, the driving circuit 141 may include a digital-to-analog inverter DAC to output a sensing data voltage and a black data voltage in addition to a display data voltage Vdata. The sensing circuit 145 may include a first voltage circuit SPRE, a second voltage circuit RPRE, a sampling circuit SAM, an analog-to-digital converter ADC, etc. to output a voltage to the subpixel SP and the first reference line VREF1 and sense the voltage.

The first voltage circuit SPRE and the second voltage circuit RPRE may perform a voltage output operation to initialize a node or a circuit included in the subpixel SP or charge the node or the circuit with a voltage at a specific level. The first voltage circuit SPRE and the second voltage circuit RPRE may include a first reference voltage source VPRES and a second reference voltage source VPRER, respectively. The first voltage circuit SPRE may output a first reference voltage based on the first reference voltage source VPRES, and the second voltage circuit RPRE may output a second reference voltage based on the second reference voltage source VPRER. The first reference voltage is a voltage for use in a sensing mode (compensation mode) for deterioration compensation, and the second reference voltage may be defined as a voltage for use in a driving mode (normal mode) for image display. Further, the first reference voltage may be set to a voltage lower than the second reference voltage.

The sampling circuit SAM may perform a sampling operation to acquire a sensing voltage through the first reference line VREF1. The analog-to-digital converter ADC may convert an analog sensing voltage acquired by the sampling circuit SAM into a digital sensing voltage and output the converted sensing voltage. The analog-to-digital converter ADC may change the scale (scale up or scale down) to easily convert the sensing voltage stored in a sampling capacitor SCAP.

The sensing circuit 145 may acquire a sensing voltage Vsen to compensate for deterioration of the driving transistor DT or the organic light-emitting diode OLED included in the subpixel SP through a sensing capacitor PCAP formed on the first reference line VREF1. The sensing circuit 145 may acquire the sensing voltage Vsen through the sampling capacitor SCAP formed in the sampling circuit SAM, convert the analog sensing voltage Vsen acquired through the analog-to-digital converter ADC into a digital sensing voltage VSEN, and output the converted sensing voltage. The digital sensing voltage VSEN output from the sensing circuit 145 may be transmitted to the timing controller 120. The digital sensing voltage VSEN may be transmitted and received through a communication interface (for example, LVDS) connected between the data driver 140 and the timing controller 120.

The timing controller 120 may determine whether the driving transistor DT or the organic light-emitting diode OLED included in the subpixel SP has deteriorated based on the digital sensing voltage VSEN and perform a compensation operation to compensate for the deterioration. For example, the timing controller 120 may output the data signal DATA supplied from the image supply without change or output a compensation data signal CDATA obtained by performing the compensation operation.

The timing controller 120 may output a sampling control signal SAMC capable of turning on or turning off the sampling circuit SAM included in the sensing circuit 145.

The sampling control signal SAMC may vary an on/off time of the sampling circuit SAM in response to variation of the first power applied through the first power line EVDD. The timing controller 120 may output a gate control signal GCS capable of varying a second scan signal applied to the second scan line Gate2. The gate control signal GCS may vary the on/off time of the second scan signal in response to variation of the first power applied through the first power line EVDD. The scan driver may vary the on/off time of the second scan signal in response to the gate control signal GCS.

As illustrated in FIGS. 13 to 15, according to the second embodiment, sensing periods PSP1 to PSP3 for sensing the subpixel SP included in the display panel may include a first period PSP1, a second period PSP2, and a third period PSP3.

A first scan signal Scan applied to the first scan line Gate1 may be in a high H state (on time of the first scan signal) during the first period PSP1. Accordingly, the switching transistor SW may be turned on in response to the first scan signal Scan in the high H state during the first period PSP1.

A second scan signal Sense applied to the second scan line Gate2 may be in a high H state (on time of the second scan signal) during the first period PSP1 and the second period PSP. Accordingly, the sensing transistor ST may be turned on in response to the second scan signal Sense in the high H state during the first period PSP1 and the second period PSP2.

A first voltage control signal Spre applied to the first voltage circuit SPRE may be in a high H state (on time of the first voltage control signal) during the first period PSP1. Accordingly, the first voltage circuit SPRE may output the first reference voltage required for the sensing mode through the first reference line VREF1 in response to the first voltage control signal Spre in the high H state during the first period PSP1.

The digital-to-analog inverter DAC included in the driving circuit 141 may operate during the first period PSP1. Accordingly, the digital-to-analog inverter DAC may output the sensing data voltage Vdata required for the sensing mode through the first data line DL1 during the first period PSP1.

The sampling control signal SAMC applied to the sampling circuit SAM may be in a high H state (on time of the sampling control signal) during the third period PSP3. Accordingly, the sampling circuit SAM may acquire the sensing voltage Vsen stored in the first reference line VREF1 in response to the sampling control signal SAMC in the high H state during the third period PSP3.

FIG. 14 is an example diagram illustrating that a sampling point for acquiring the sensing voltage Vsen is advanced to the first time SAM_On @ T1 as the first power Evdd2 at a second level higher than the first power Evdd1 is applied. Further, FIG. 15 illustrates that the sampling point for acquiring the sensing voltage Vsen is delayed to the second time SAM_On @ T2 later than the first time SAM_On @ T1 as the first power Evdd1 at the first level lower than the first power Evdd2 at the second level is applied. Therefore, the waveform diagrams of FIGS. 14 and 15 need to be interpreted as an example to describe that the sampling point may be varied in response to a change in the level of the first power.

As illustrated in FIGS. 16 and 17, the sensing voltage Vsen may be related to a current applied to the sensing capacitor formed on the reference line. The sensing voltage Vsen may vary in response to a change in voltage Δt and a change in time Δt. Therefore, by varying the sampling point corresponding to an element that varies the time Δt among elements that determine the sensing voltage Vsen, a difference due to the change in the first power may be compensated.

Based thereon, in the second embodiment, a sampling point differentially prepared from the first time SAM_On @ T1 to an Nth time SAM_On @ Tn in response to a change in the first power from the first power Evdd1 at the first level to the first power Evddn at the Nth level (N being an integer greater than or equal to 2) may be defined as a range of sampling points. Further, by using one of sampling points set in the range of sampling points in response to a change in the first power, it is possible to increase a probability of obtaining a constant (uniform) sensing voltage (sensing voltage value) Vsen.

As can be seen through the description of the second embodiment, the sampling point for acquiring the sensing voltage Vsen may be varied in response to a change in the first power. However, a specific level of the first power may be defined as a reference sampling point, and the sampling point may be set to vary therefrom in response to a change in a level of the first power when the level decreases or increases. In this instance, to define the reference sampling point, the reference level of the first power may be determined based on experiment or simulation. However, the present disclosure is not limited thereto.

Therefore, in the second embodiment, even when the level of the first power Evdd is variable, a constant (uniform) sensing voltage (sensing voltage value) Vsen may be acquired. Therefore, it is possible to improve compensation accuracy and minimize occurrence of sensing errors.

Figure 18:
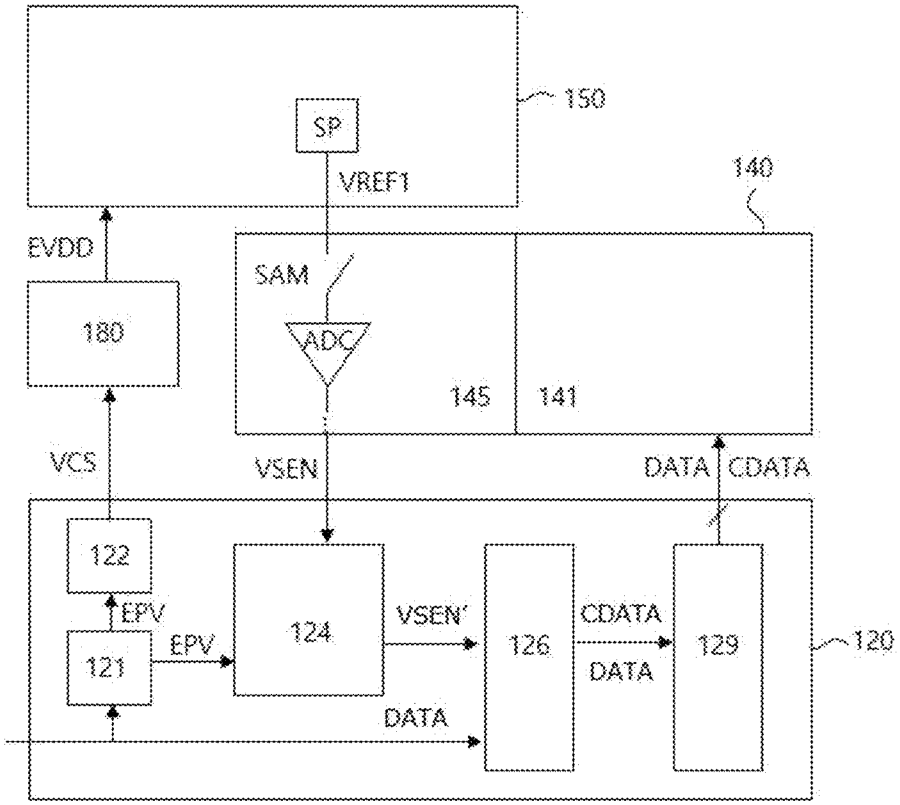
FIG. 18 is an example diagram illustrating a main configuration included in an LED device in more detail according to a third example embodiment.
Figure 19:
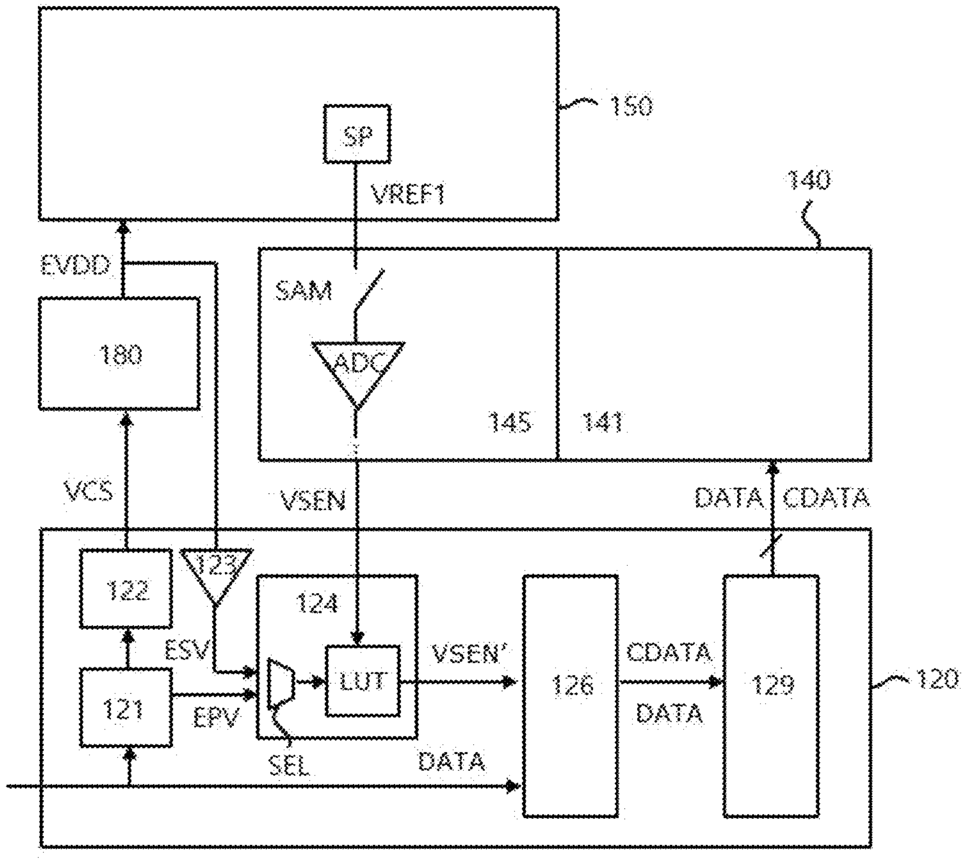
FIG. 19 is an example diagram illustrating a modification of the third embodiment.

FIG. 18 is an example diagram illustrating a main configuration included in an LED device in more detail according to a third example embodiment, and FIG. 19 is an example diagram illustrating a modification of the third embodiment.

As illustrated in FIG. 18, according to the third embodiment, a timing controller 120 may include a first power calculator 121, a first power controller 122, a sensing voltage corrector 124, a data compensator 126, a signal output circuit 129, etc.

The first power calculator 121 may calculate a level of the first power required to drive the display panel 150 based on the data signal DATA supplied from the outside and prepare a first power calculation value EPV. The first power calculator 121 may prepare the first power calculation value EPV such that the level of the first power output from the power supply 180 may be increased or decreased depending on the characteristics of the data signal DATA.

The first power controller 122 may output a power control signal VCS for determining or varying the level of the first power output from the power supply 180 based on the first power calculation value EPV transmitted from the first power calculator 121.

The sensing voltage corrector 124 may prepare a sensing voltage VSEN' corrected based on the first power calculation value EPV (which may be also referred to as a calculation result value of the first power) provided from the first power calculator 121 and the sensing voltage VSEN transmitted from the data driver 140. The sensing voltage corrector 124 may output the sensing voltage VSEN without change when the level of the first power is not varied and is maintained constant, and generate the sensing voltage VSEN' corrected by reflecting a change in the level of the first power in the sensing voltage VSEN when there is a change in the level of the first power.

The data compensator 126 may compensate for the data signal DATA supplied from the outside based on the sensing voltage VSEN or the corrected sensing voltage VSEN'. The data compensator 126 may determine whether there is deterioration (in threshold voltage, mobility, etc.) of the element included in the subpixel SP of the display panel 150 based on the sensing voltage VSEN or the corrected sensing voltage VSEN'. The data compensator 126 may output the data signal DATA supplied from the outside without change in response to the presence or absence of deterioration of the element included in the subpixel SP, or may compensate for the data signal DATA based on the sensing voltage VSEN or the corrected sensing voltage VSEN' and output a compensated data signal CDATA.

The signal output circuit 129 may output the data signal DATA or the compensated data signal CDATA transmitted from the data compensator 126. The signal output circuit 129 may output the data signal DATA or the compensated data signal CDATA through a communication interface (for example, EPI) connected to the data driver 140.

Meanwhile, FIG. 18 illustrates that the sampling circuit SAM and the analog-to-digital converter ADC included in the sensing circuit 145 of the data driver 140 sense the subpixel SP through the first reference line VREF1 of the display panel 150. However, note that the first reference line VREF1 illustrated in FIG. 18 corresponds to any reference line present on the display panel 150.

According to the third embodiment, the timing controller 120 may predict (detect) a change in the first power based on the first power calculation value EPV, correct the sensing voltage VSEN transmitted from the data driver 140 in response thereto, and prepare the corrected sensing voltage VSEN'. The third embodiment may perform correction by reflecting a change in the level of the first power in the sensing voltage (sensing voltage value) VSEN even when the level of the first power is varied, and thus may improve compensation accuracy and minimize occurrence of sensing errors.

As illustrated in FIG. 19, according to a modification of the third embodiment, a timing controller 120 may include a first power calculator 121, a first power controller 122, a voltage sensor 123, a sensing voltage corrector 124, a data compensator 126, a signal output circuit 129, etc. Hereinafter, in the modification of the third embodiment, the description will focus on different parts compared to the third embodiment.

The voltage sensor 123 may sense the first power output from the power supply 180 and output a first power sensing value ESV. For example, the voltage sensor 123 may convert an analog first power sensing value into a digital first power sensing value ESV and output the converted first power sensing value.

Meanwhile, FIG. 19 illustrates an example in which the voltage sensor 123 is included inside the timing controller 120. However, the voltage sensor 123 may be included inside the power supply 180. In this case, the power supply 180 may transmit the digital first power sensing value ESV through a communication interface connected to the timing controller 120.

The sensing voltage corrector 124 may prepare the corrected sensing voltage VSEN' by correcting the sensing voltage VSEN based on one of a predicted value such as the first power calculation value EPV and an actual measured value such as the first power sensing value ESV. The sensing voltage corrector 124 may include a selector SEL and a lookup table LUT. The selector SEL may select one of the first power calculation value EPV output from the first power calculator 121 and the first power sensing value ESV and transmit the selected value to the lookup table LUT. The lookup table LUT may include a data table (correction data value for each level of EVDD) capable of preparing the corrected sensing voltage VSEN' by correcting the sensing voltage VSEN in response to a change in the level of the first power.

According to the modification of the third embodiment, the timing controller 120 may predict (detect) a change in the first power based on one of a predicted value and an actual measured value, correct the sensing voltage VSEN transmitted from the data driver 140 in response thereto, and prepare the corrected sensing voltage VSEN'. The modification of the third embodiment is similar to the third embodiment. However, since the corrected sensing voltage (sensing voltage value) VSEN' is prepared by detecting the change in the first power based on one of the predicted value and the actual measured value, there is an advantage in being able to adaptively respond to driving characteristics or a driving environment of a device.

Figure 20:
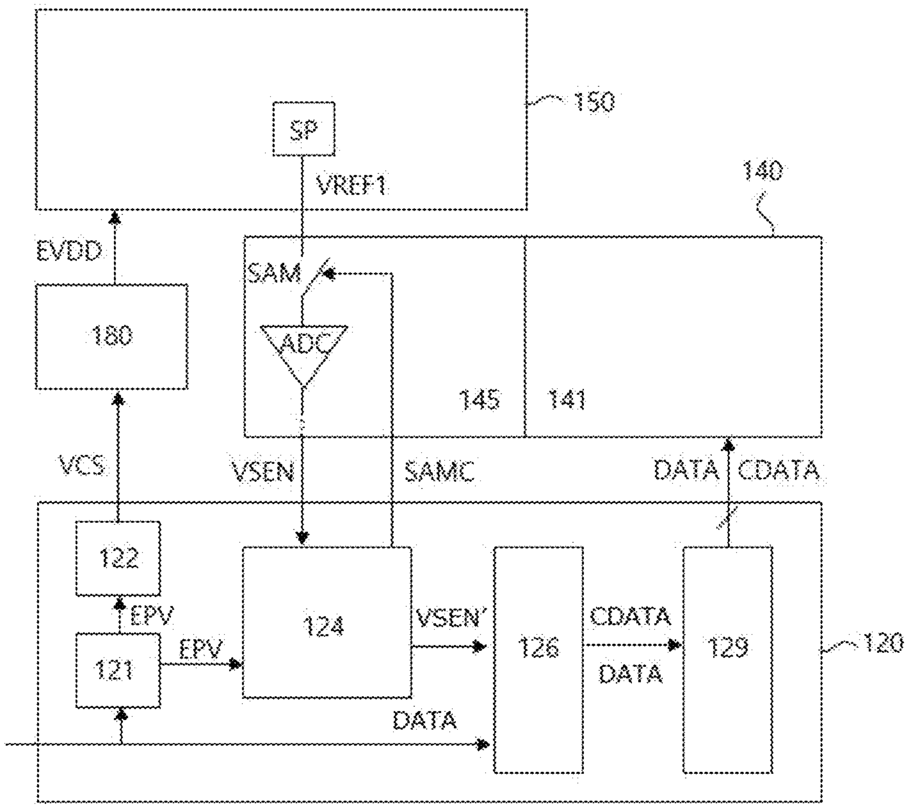
FIG. 20 is an example diagram illustrating a main configuration included in an LED device in more detail according to a fourth example embodiment.
Figure 21:
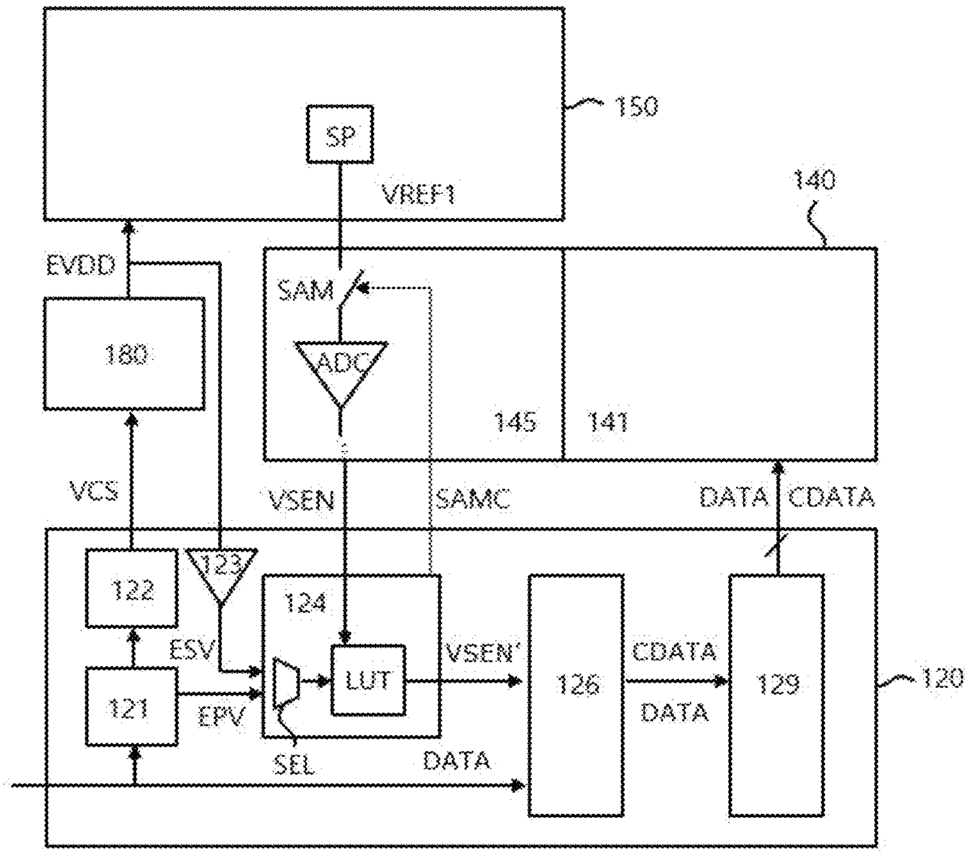
FIG. 21 is an example diagram illustrating a modification of the fourth embodiment.

FIG. 20 is an example diagram illustrating a main configuration included in an LED device in more detail according to a fourth example embodiment, and FIG. 21 is an example diagram illustrating a modification of the fourth embodiment.

As illustrated in FIG. 20, according to the fourth embodiment, a timing controller 120 may include a first power calculator 121, a first power controller 122, a sensing voltage corrector 124, a data compensator 126, a signal output circuit 129, etc. Hereinafter, the fourth embodiment will mainly describe different parts compared to the third embodiment.

The sensing voltage corrector 124 may prepare the corrected sensing voltage VSEN' by correcting the sensing voltage VSEN based on the first power calculation value EPV. The sensing voltage corrector 124 may generate a sampling control signal SAMC for controlling the sampling time of the sampling circuit SAM included in the sensing circuit 145 in response to the level change of the first power based on the first power calculation value EPV.

According to the fourth embodiment, the timing controller 120 may acquire the sensing voltage (sensing voltage value) by varying the sampling point in response to the change in the level of the first power, and thus may improve compensation accuracy and minimize occurrence of sensing errors.

As illustrated in FIG. 21, according to the modification of the fourth embodiment, the timing controller 120 may include a first power calculator 121, a first power controller 122, a voltage sensor 123, a sensing voltage corrector 124, a data compensator 126, a signal output circuit 129, etc. Hereinafter, in the modification of the fourth embodiment, the description will focus on different parts compared to the fourth embodiment.

The first power calculator 121 may calculate a level of the first power required to drive the display panel 150 based on the data signal DATA supplied from the outside and prepare a first power calculation value EPV. The first power calculator 121 may prepare the first power calculation value EPV such that the level of the first power output from the power supply 180 may be increased or decreased depending on the characteristics of the data signal DATA.

The voltage sensor 123 may sense first power output from the power supply 180 and output a first power sensing value ESV. For example, the voltage sensor 123 may convert an analog first power sensing value into a digital first power sensing value ESV and output the converted first power sensing value.

Meanwhile, FIG. 21 illustrates an example in which the voltage sensor 123 is included inside the timing controller 120. However, the voltage sensor 123 may be included inside the power supply 180. In this case, the power supply 180 may transmit the digital first power sensing value ESV through a communication interface connected to the timing controller 120.

The sensing voltage corrector 124 may prepare a corrected sensing voltage VSEN' by correcting the sensing voltage VSEN based on one of a predicted value such as the first power calculation value EPV and an actual measured value such as the first power sensing value ESV. The sensing voltage corrector 124 may include a selector SEL and a lookup table LUT. The selector SEL may select one of the first power calculation value EPV output from the first power calculator 121 and the first power sensing value ESV and transmit the selected value to the lookup table LUT. The lookup table LUT may include a data table capable of preparing the corrected sensing voltage VSEN' by correcting the sensing voltage VSEN in response to a change in the level of the first power.

The sensing voltage corrector 124 may generate a sampling control signal SAMC for control of the sampling time of the sampling circuit SAM included in the sensing circuit 145 in response to a level change of the first power based on one of the first power calculation value EPV and the first power sensing value EVS.

According to the modification of the fourth embodiment, the timing controller 120 may detect a change in the first power based on one of the predicted value and the actual measured value, and prepare a sampling control signal SAMC together with the corrected sensing voltage VSEN' in response thereto. The modification of the fourth embodiment is similar to the fourth embodiment. However, since the sampling control signal SAMC is prepared together with the corrected sensing voltage (sensing voltage value) VSEN' by detecting the change in the first power based on one of the predicted value and the actual measured value, there is an advantage of being able to adaptively respond to driving characteristics or a driving environment of a device.

Meanwhile, for convenience of description, FIGS. 20 and 21 illustrate that the sampling control signal SAMC prepared from the sensing voltage corrector 124 is directly applied to the sampling circuit SAM included in the sensing circuit 145 of the data driver 140. However, the sampling control signal SAMC may be transmitted and received through a communication interface provided between the timing controller 120 and the data driver 140.

The present disclosure has an effect of being able to improve compensation accuracy by varying the sampling point in response to a change in the level of the first power and increasing a probability of acquiring a constant (uniform) sensing voltage even when the level of the first power changes. In addition, the present disclosure has an effect of being able to improve compensation accuracy even when the level of the first power changes since a change in the level of the first power may be reflected in the sensing voltage. Further, the present disclosure has an effect of being able to minimize occurrence of sensing errors even when the level of the first power changes.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device, comprising:
- a display panel comprising a subpixel connected to a power line, a data line, and a reference line;
- a power supply configured to supply power to the display panel through the power line;
- a data driver comprising:
  - a driving circuit configured to supply a data voltage to the display panel through the data line; and
  - a sensing circuit configured to sense the display panel through the reference line; and
- a timing controller configured to control the power supply and the data driver,
- wherein the sensing circuit has a variable sampling point for sensing the display panel in response to a change in a level of the power, and
- wherein the sensing circuit is further configured to:
  - advance a sampling time from a reference sampling time when the level of the power becomes higher than a reference level; and
  - delay the sampling time from the reference sampling time when the level of the power becomes lower than the reference level.

2. The display device according to claim 1, wherein:
- the sensing circuit comprises a sampling circuit configured to sense the reference line; and
- the sampling time corresponds to a turn-on time of the sampling circuit.

3. The display device according to claim 1, wherein the timing controller is further configured to:
- calculate a level of a first power required to drive the display panel based on a data signal to prepare a first power calculation value; and
- generate a sampling control signal for varying the sampling time based on the first power calculation value.

4. The display device according to claim 3, wherein the timing controller is further configured to generate a sampling control signal for varying the sampling time based on one of a first power sensing value prepared by sensing a first power output from the power supply and the first power calculation value.

5. A display device, comprising:
- a display panel comprising a subpixel connected to a power line, a data line, and a reference line;
- a power supply configured to supply power to the display panel through the power line;
- a data driver comprising:
  - a driving circuit configured to supply a data voltage to the display panel through the data line; and
  - a sensing circuit configured to sense the display panel through the reference line to prepare a sensing voltage; and
- a timing controller configured to control the power supply and the data driver,
- wherein the timing controller is further configured to:
  - prepare a sensing voltage corrected by reflecting a change of a level of the power in the sensing voltage transmitted from the sensing circuit; and
  - compensate for a data signal based on the corrected sensing voltage to generate a compensated data signal.

6. The display device according to claim 5, wherein the timing controller is further configured to:
- calculate a level of a first power required to drive the display panel based on the data signal to prepare a first power calculation value;

predict a change of the level of the first power based on the first power calculation value; and reflect the predicted change in the sensing voltage to prepare the corrected sensing voltage.

7. The display device according to claim 6, wherein the timing controller is further configured to:

predict a change of the level of the first power based on one of a first power sensing value prepared by sensing a first power output from the power supply and the first power calculation value; and reflect the predicted change in the sensing voltage to prepare the corrected sensing voltage.

8. The display device according to claim 7, wherein the timing controller is further configured to generate a sampling control signal that varies a sampling time for sensing the display panel based on one of the first power sensing value and the first power calculation value.

9. The display device according to claim 8, wherein:

the sensing circuit comprises a sampling circuit configured to sense the reference line to prepare the sensing voltage, and the sampling time corresponds to a turn-on time of the sampling circuit.

10. The display device according to claim 6, wherein the timing controller comprises a lookup table including a data table for preparing the corrected sensing voltage in response to a change in the level of the first power.

* * * * *